(12) United States Patent
Van Horn et al.

(10) Patent No.: US 9,206,297 B2
(45) Date of Patent: *Dec. 8, 2015

(54) BLOWING AGENT COMPOSITIONS OF HYDROCHLOROFLUOROOLEFINS

(71) Applicant: Arkema Inc., King of Prussia, PA (US)

(72) Inventors: Brett L. Van Horn, King of Prussia, PA (US); Maher Y. Elsheikh, Wayne, PA (US); Benjamin Bin Chen, Wayne, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,456

(22) Filed: Oct. 21, 2014

(65) Prior Publication Data

US 2015/0038603 A1 Feb. 5, 2015

Related U.S. Application Data

(60) Continuation-in-part of application No. 14/044,965, filed on Oct. 3, 2013, now Pat. No. 8,895,635, which is a continuation-in-part of application No. 13/342,307, filed on Jan. 3, 2012, now abandoned, which is a division of application No. 12/532,253, filed as application No. PCT/US2008/058596 on Mar. 28, 2008, now abandoned.

(60) Provisional application No. 60/908,762, filed on Mar. 29, 2007.

(51) Int. Cl.
*C08J 9/14* (2006.01)
*C08J 9/00* (2006.01)
*C08J 9/12* (2006.01)

(52) U.S. Cl.
CPC *C08J 9/144* (2013.01); *C08J 9/122* (2013.01); *C08J 9/127* (2013.01); *C08J 9/141* (2013.01); *C08J 9/146* (2013.01); *C08J 9/149* (2013.01); *C08J 2201/03* (2013.01); *C08J 2203/06* (2013.01); *C08J 2203/14* (2013.01); *C08J 2203/162* (2013.01); *C08J 2203/182* (2013.01); *C08J 2203/202* (2013.01); *C08J 2205/052* (2013.01); *C08J 2323/06* (2013.01); *C08J 2323/12* (2013.01); *C08J 2325/06* (2013.01)

(58) Field of Classification Search
USPC .................. 521/98, 131; 252/182.15
See application file for complete search history.

(56) References Cited

U.S. PATENT DOCUMENTS

| | | | |
|---|---|---|---|
| 4,085,073 A | 4/1978 | Suh et al. | |
| 4,323,528 A | 4/1982 | Collins | |
| 2004/0119047 A1 | 6/2004 | Singh et al. | |
| 2004/0256594 A1 | 12/2004 | Singh et al. | |
| 2006/0142173 A1 | 6/2006 | Johnson et al. | |
| 2006/0243944 A1 | 11/2006 | Minor et al. | |
| 2007/0010592 A1 | 1/2007 | Bowman et al. | |
| 2008/0157022 A1 | 7/2008 | Singh et al. | |
| 2010/0004155 A1 | 1/2010 | Ishihara et al. | |
| 2010/0087555 A1 | 4/2010 | Vo et al. | |
| 2010/0105789 A1 | 4/2010 | Van Horn et al. | |
| 2010/0112328 A1 | 5/2010 | Van Horn et al. | |

FOREIGN PATENT DOCUMENTS

| | | |
|---|---|---|
| CA | 2 016 328 | 11/1990 |
| CA | 2 681 602 | 10/2008 |
| CA | 2 681 605 | 10/2008 |
| GB | 950876 | 2/1964 |
| WO | WO 2004/037913 A2 | 5/2004 |
| WO | WO 2005/105947 A2 | 1/2005 |
| WO | WO 2006/069362 A2 | 6/2006 |
| WO | WO 2007/002625 A2 | 1/2007 |
| WO | WO 2007/002703 A2 | 1/2007 |

*Primary Examiner* — Kara Boyle
(74) *Attorney, Agent, or Firm* — Steven D. Boyd

(57) ABSTRACT

The present invention relates to foam products made with blowing agent compositions comprising at least one hydrochlorofluoroolefin (HCFO) used in the preparation of foamable thermoplastic compositions. The HCFOs of the present invention include, but are not limited to, 1-chloro-3,3,3-trifluoropropene (HCFO-1233zd), particularly the trans-isomer, 2-chloro-3,3,3-trifluoropropene (HCFO-1233xf), dichlorofluorinated propenes, and mixtures thereof. The blowing agent compositions of the present invention are used with coblowing agents including carbon dioxide, atmospheric gases, hydrofluorocarbons (HFC), hydrofluoroolefins (HFO), alkanes, hydrofluoroethers (HFE), and mixtures thereof. Preferred HFCs used as coblowing agents in the present invention include, but are not limited too, 1,1,1,2-tetrafluoroethane (HFC-134a), 1,1-difluoroethane (HFC-152a), 1,1,1-trifluoroethane (HFC-143a), pentafluorethane (HFC-125), difluoromethane (HFC-32). The blowing agent compositions are useful in the production of low density insulating foams with improved k-factor.

32 Claims, 2 Drawing Sheets

BLOWING AGENT COMPOSITIONS OF HYDROCHLOROFLUOROOLEFINS

The present application is a continuation-in-part of application of U.S. patent application Ser. No. 14/044,965 filed Oct. 3, 2013 which claims priority to U.S. patent application Ser. No. 13/342,307 filed Jan. 3, 2012 (now abandoned) which claimed priority to U.S. patent application Ser. No. 12/532,253 filed Sep. 21, 2009 (now abandoned) which claimed priority to International patent application serial number PCT/US08/58596 filed Mar. 28, 2008 which claimed priority to United Stated provisional patent application Ser. No. 60/908,762 filed Mar. 29, 2007.

SUMMARY OF INVENTION

The present invention relates to blowing agent compositions comprising at least one hydrochlorofluoroolefin (HCFO) used in the preparation of foamable thermoplastic compositions. The HCFOs of the present invention include, but are not limited to, 1-chloro-3,3,3-trifluoropropene (HCFO-123zd), particularly the trans-isomer, 2-chloro-3,3,3-trifluoropropene (HCFO-1233xf), dichloro-fluorinated propenes, and mixtures thereof. The blowing agent compositions of the present invention are preferably used with coblowing agents including carbon dioxide, atmospheric gases, hydrofluorocarbons (HFC), hydrofluoroolefins (HFO), alkanes, hydrofluoroethers (HFE), and mixtures thereof. Preferred HFCs used as coblowing agents in the present invention include, but are not limited too, 1,1,1,2-tetrafluoroethane (HFC-134a); 1,1-difluoroethane (HFC-152a); 1,1,1-trifluoroethane (HFC-143a); pentafluorethane (HFC-125); and difluoromethane (HFC-32). The blowing agent compositions are useful in the production of low density insulating foams with improved k-factor.

BACKGROUND OF INVENTION

With the continued concern over global climate change there is an increasing need to develop technologies to replace those with high ozone depletion potential (ODP) and high global warming potential (GWP). Though hydrofluorocarbons (HFC), being non-ozone depleting compounds, have been identified as alternative blowing agents to chlorofluorocarbons (CFCs) and hydrochlorofluorocarbons (HCFCs) in the production of thermoplastic foams, they still tend to have significant GWP.

It was discovered that blowing agent compositions comprising a hydrochlorofluoroolefin, particularly HCFO-123zd, HCFO-1233xf, dichloro-fluorinated propenes, and mixtures thereof can permit the production of lower density, closed-cell foam and good k-factor which will be particularly useful for thermal insulating foams. This invention may also permit the production of low density, closed-cell foams with enlarged, controlled cell size.

WO 2004/037913, WO 2007/002703, and US Pat. Publication 2004119047 discloses blowing agents comprising halogenated alkenes of generic formula that would include numerous HCFOs, among many other materials including brominated and iodinated compounds and HFOs. Specific HCFOs for use in thermoplastic foaming are not disclosed nor are the benefits of using the HCFOs in terms of increasing the foam cell size as discovered in the present invention. HCFO-123zd is disclosed for use in polyurethane foaming, however it is not obvious to one skilled in the art that a blowing agent for polyurethane foaming would be particularly good for thermoplastic foaming.

GB 950,876 discloses a process for the production of polyurethane foams. It discloses that any suitable halogenated saturated or unsaturated hydrocarbon having a boiling point below 150° C., preferably below 50° C., can be used as the blowing agent. Trichlorofluoroethene, chlorotrifluoroethene, and 1,1-dichloro-2,2-difluoroethane are disclosed in a list of suitable blowing agents. Hydrochlorofluoropropenes are not specifically disclosed nor are longer chain HCFOs. There is no disclosure related to blowing agents for thermoplastic foaming nor are the benefits of HCFOs in thermoplastic foaming mentioned nor preferred combinations of HCFOs with other coblowing agents.

CA 2016328 discloses a process for preparing closed-cell, polyisocyanate foam. Disclosed are organic compound blowing agents including halogenated alkanes and alkenes, where the alkene is propylene, and the halogenated hydrocarbons can be chlorofluorocarbons. Among the many exemplary compounds listed are specific chlorofluoroethylenes containing 1 chlorine and from 1 to 3 fluorines. Hydrochlorofluoropropenes are not specifically disclosed nor are longer chain HCFOs. There is no disclosure related to blowing agents for thermoplastic foaming nor are the benefits of HCFOs in thermoplastic foaming mentioned nor preferred combinations of HCFOs with other coblowing agents.

DETAILED DESCRIPTION OF INVENTION

Figure 1:
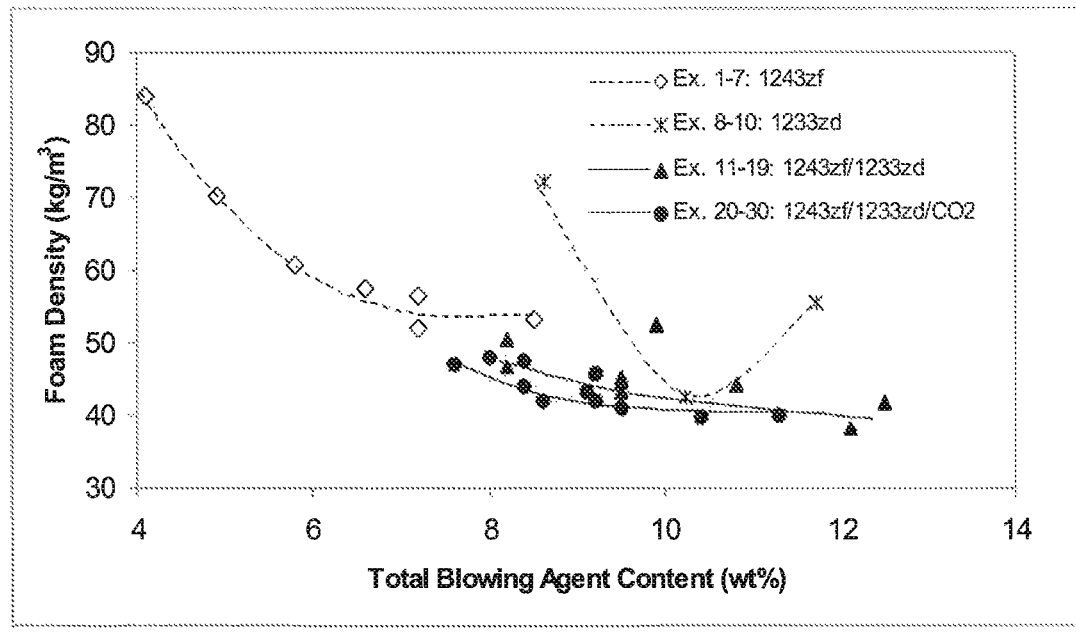
FIG. 1 is a plot of total blowing agent content versus foam density for examples 21 through 50

The present invention relates to the use of blowing agents with negligible ozone-depletion and low GWP comprising a hydrochlorofluoroolefin (HCFO) used with an additional blowing agent. The present invention discloses blowing agent and foamable resin compositions useful for the production of foams with decreased density, enlarged cell size, and improved k-factor that can be used as insulating foams. In a preferred embodiment of this invention the HCFO is 1-chloro-3,3,3-trifluoropropene (HCFO-123zd), preferably the trans isomer; 2-chloro-3,3,3-trifluoropropene (HCFO-1233xf), and mixtures thereof. Preferred coblowing agents to be used with the HCFO include hydrofluorocarbons (HFC), preferably 1,1,1,2-tetrafluoroethane; 1,1-difluoroethane (HFC-152a); pentafluoroethane (HFC-125); 1,1,1-trifluoroethane (HFC-143a); difluoromethane (HFC-32); hydrofluoroolefins (HFO), preferably 3,3,3-trifluoropropene (HFO-1243zf); 1,3,3,3-tetrafluoropropene (HFO-1234ze), particularly the trans isomer; 2,3,3,3-tetrafluoropropene (HFO-1234yf); (cis and/or trans)-1,2,3,3,3-pentafluoropropene (HFO-1225ye); carbon dioxide; alkanes, preferably a butane or a pentane, and mixtures thereof. The blowing agent composition preferably comprises form about 50 to 75 wt % of the coblowing agent.

Another embodiment of this invention are foamable resin compositions containing greater than about 1 parts per hundred (pph) and less than about 100 pph of the blowing agent composition with respect to resin, preferably greater than about 2 pph and less than about 40 pph, more preferably greater than about 3 pph and less than about 25 pph, and even more preferably greater than about 4 pph and less than about 15 pph of the blowing agent composition with respect to resin.

The process for preparing a foamed thermoplastic product is as follows: Prepare a foamable polymer composition by blending together components comprising foamable polymer composition in any order. Typically, prepare a foamable polymer composition by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin near or above its glass transition temperature (Tg), or melt temperature (Tm) for crystalline polymers.

A foamable polymer composition can contain additional additives such as nucleating agents, cell-controlling agents, dyes, pigments, fillers, antioxidants, extrusion aids, stabilizing agents, antistatic agents, fire retardants, IR attenuating agents and thermally insulating additives. Nucleating agents can include, among others, materials such as talc, calcium carbonate, sodium benzoate, and chemical blowing agents such azodicarbonamide or sodium bicarbonate and citric acid. IR attenuating agents and thermally insulating additives can include carbon black, graphite, silicon dioxide, metal flake or powder, among others. Flame retardants can include, among others, brominated materials such as hexabromocyclodecane and polybrominated biphenyl ether.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam.

A semi-batch process involves preparing at least a portion of a foamable polymer composition and intermittently expanding that foamable polymer composition into a foam all in a single process. For example, U.S. Pat. No. 4,323,528, incorporated herein by reference, discloses a process for making polyolefin foams via an accumulating extrusion process. The process comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam.

A continuous process involves forming a foamable polymer composition and then expanding that foamable polymer composition in a non-stop manner. For example, prepare a foamable polymer composition in an extruder by heating a polymer resin to form a molten resin, blending into the molten resin a blowing agent composition at an initial pressure to form a foamable polymer composition, and then extruding that foamable polymer composition through a die into a zone at a foaming pressure and allowing the foamable polymer composition to expand into a foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another. The density of the foams of the present invention is preferably less than about 75 kg/m$^3$. The open cell content of the foams of the present invention preferably ranges from about 0 to 50% open cell, more preferably from about 0 to 30% open cell, even more preferably from about 0 to 15% open cell, even more preferably from about 0 to 10% open cell. The cell size of the foams of the present invention preferably ranges from about 0.05 to 1 mm, more preferably from about 0.1 to 0.5 mm, and even more preferably from about 0.2 to 0.4 mm.

EXAMPLES

Examples 1-7

Solubility and Diffusivity of Gases in Polystyrene

The solubility and diffusivity of gases in polystyrene resin was measured using capillary column inverse gas chromatography (cc-IGC) as described in: Hadj Romdhane, Ilyess (1994) "Polymer-Solvent Diffusion and Equilibrium Parameters by Inverse Gas-Liquid Chromatography" PhD Dissertation, Dept. of Chem. Eng., Penn State University. and Hong S U, Albouy A, Duda J L (1999) "Measurement and Prediction of Blowing Agent Solubility in Polystyrene at Supercritical Conditions" Cell Polym 18(5):301-313.

A 15 m long, 0.53 mm diameter GC capillary-column was prepared with a 3 micron thick polystyrene internal film coating. The column was installed into a Hewlet Packard 5890 Series II Gas Chromatograph with flame ionizer detector. Elution profiles for gases being tested were analyzed according the method outlined in the reference, using methane as the reference gas. The results give the diffusion coefficient of the gas through the polymer, Dp, and the solubility of the gas in the polymer in terms of the partition coefficient, K, which is the ratio of the concentration of the gas in the polymer phase to the concentration in the vapor phase. As such, the greater the value of K for a particular gas in the resin the greater its solubility in that resin.

Table 1 shows the partition coefficient and diffusivity values for several gases in polystyrene at 140° C. Comparative examples 1-5 show the solubility and diffusivity of HCFC-142b (1-chloro-1,1-difluoroethane), HFC-152a (1,1-difluoroethane), HFC-134a (1,1,1,2-tetrafluoroethane), HFC-32 (difluoromethane), and HFC-245fa (1,1,1,3,3-pentafluoropropane) in polystyrene (PS). Examples 6 and show the solubility and diffusivity of trans-HCFO-123zd (1-chloro-3,3,3-trifluoropropene) and HCFO-1233xf (2-chloro-3,3,3-trifluoropropene).

These examples show that HCFO-123zd and HCFO-1233xf have sufficient solubility and diffusivity in polystyrene resin to be effective blowing agents or as useful coblowing agents with other blowing agents such as HFCs or carbon dioxide. HCFO-1233xf, for instance, was found to have a solubility comparable to that of HCFC-142b. The diffusivities of HCFO-123zd and HCFO-1233xf were found to be low, indicating that should be useful in providing foams with improved k-factor.

TABLE 1

Partition Coefficient and Diffusivity of Gases in Polystyrene
at 140° C. by Inverse Gas Chromatography

| Example | Gas | Bp (° C.) | Mw (g/mol) | K | Dp (cm$^2$/s) |
|---|---|---|---|---|---|
| 1 | HCFC-142b | −9.8 | 100.5 | 1.249 | 2.61E−08 |
| 2 | HFC-152a | −24.1 | 66.05 | 0.734 | 9.49E−08 |
| 3 | HFC-134a | −26.1 | 102.02 | 0.397 | 3.40E−08 |
| 4 | HFC-32 | −51.7 | 52.02 | 0.436 | 1.95E−07 |
| 5 | HFC-245fa | 15.1 | 134.05 | 0.639 | 2.05E−08 |
| 6 | HCFO-1233zd | 20.5 | 130.5 | 2.326 | 1.72E−08 |
| 7 | HCFO-1233xf | 15 | 130.5 | 1.475 | 1.67E−08 |

Examples 8-20

Extruded polystyrene foam was produced using a counter-rotating twin screw extruder with internal barrel diameters or 27 mm and a barrel length of 40 diameters. The screw design was suitable for foaming applications. The pressure in the extruder barrel was controlled with the gear pump and was set high enough such that the blowing agent dissolved in the extruder. The extruder die for examples 9-20 was an adjustable-lip slot die with a gap width of 6.35 mm. For example 1, the die was a 2 mm diameter strand die with a 1 mm land length. Two grades of general purpose polystyrene were used for the extrusion trials and fed to the extruder at rates of either 2.27 or 4.54 kg/hr (5 or 10 lb/hr). Blowing agents were pumped into the polystyrene resin melt at a controlled rate using high pressure delivery pumps. In the extruder, the blowing agent is mixed and dissolved in the resin melt to produce an expandable resin composition. The expandable resin composition is cooled to an appropriate foaming temperature and then extruded from the die where the drop in pressure initiates foaming. Talc was used as a nucleating agent and was pre-blended with polystyrene to make a masterbatch of 50 wt % talc in polystyrene. Beads of this masterbatch were mixed with polystyrene pellets to achieve 0.5 wt % talc in each experiment.

The density, open cell content, and cell size was measured for foam samples collected during each rum Density was measured according to ASTM D792, open cell content was measured using gas pychnometry according to ASTM D285-C, and cell size was measured by averaging the cell diameters from scanning electron microscope (SEM) micrographs of foam sample fracture surfaces. SEM images are also used to observe the cell structure and qualitatively check for open cell content.

Table 2 shows data for examples 8 through 20, including the loading of each blowing agent in the formulation, the resin feed rate, melt flow index of the resin, the expandable resin melt temperature, and the density, cell size, and open cell content of the resulting foamed product.

Comparative example 8 is typical for polystyrene foaming with HFC-134a, where the poor solubility and difficulties in processing tend to lead to higher density foam with smaller size and more open cells. Increasing the amount of HFC-134a in the formulation above the solubility limit, around 6.5 wt % 134a for this system, was found to lead to many problems including blow holes, defects, foam collapse, large voids, high open cell content, and others.

Comparative examples 9 and 10 show results for foaming with 3,3,3-trifluoropene (HFO-1243zf; TFP).

In examples 11 and 12, blowing agent compositions of TFP (HFO-1243zf) and HCFO-123zd permitted production of lower density foam than achievable with TFP alone along with a beneficial enlargement in the cell size, where it was possible to produce closed-cell foam product with cell sizes greater than 0.2 mm at densities less than 53 kg/m$^3$ n m and even less than 45 kg/m$^3$. These foams would be useful as thermal insulating foams with improved k-factor.

Examples 13 through 16 were produced during the same extrusion trial. In examples 13, HFC-134a was used as the only blowing agent at a loading of 5.3 wt %. The foamed product had significant defects including blowholes and large voids. During foam extrusion there was frequent popping at the die caused by undissolved blowing agent exiting the die. Following example 13, HCFO-123zd, predominantly the trans isomer, was added to produce example 14, which resulted in reduction of the popping at the die with a reduction in the die pressure along with reducing the number of defects in the foamed product. Then the blowing agent feeds were adjusted to generate examples 15 and 16, where there was no popping at the die and only a few defects. The foam of example 13, blown using only HFC-1.34a, had a very broad or bimodal cell size distribution, with cell sizes ranging from around 0.05 mm to around 1 mm, with the larger cells near the center of the sample. The foams blown with combinations of 134a and HCFO-123zd also had non-uniform cell size distributions, with the larger cells near the core of the samples, but with much narrower distributions without the very large cells. HCFO-123zd improved the processing of the 134a blown foams, improved the general quality of the foamed product, and permitted production of lower density foam.

Examples 17 and 18 were produced during using HFO-1234yf (2,3,3,3-tetrafluoroethane) as the only blowing agent. At a loading of 5.7 wt % 1234yf, as shown in example 18, the foamed product had very small cell size, macrovoids, blow-holes, high open cell content, and frequent periods of popping at the die caused by undissolved blowing agent. Increasing the content of 1234yf made these problems worse. For examples 19 and 20, blowing agent compositions of HFO-1234yf and HCFO-123zd permitted production of lower density foam than was produced using the HFO-1234yf alone. The foamed samples of examples 19 and 20 were of good quality, with few defects and produced without popping at the die. The HCFO-123zd was predominantly the trans-isomer.

TABLE 2

| | Blowing Agent Loading | | | | Polystyrene Resin | | | Foam Properties | | |
|---|---|---|---|---|---|---|---|---|---|---|
| Example | 134a (wt %) | TFP (wt %) | 1234yf (wt %) | 1233zd (wt %) | Feed (kg/hr) | MFI (g/10 min) | $T_{melt}$ (° C.) | Density (kg/m$^3$) | Cell Size (mm) | OCC (%) |
| 8 | 6.4 | — | — | — | 2.27 | 4.0 | 111 | 60.9 | 0.06 | 23 |
| 9 | — | 6.6 | — | — | 2.27 | 11.0 | 114 | 57.6 | 0.11 | <5 |
| 10 | — | 7.2 | — | — | 2.27 | 11.0 | 115 | 58.5 | 0.11 | <5 |
| 11 | — | 4.1 | — | 6.6 | 4.54 | 11.0 | 113 | 44.3 | 0.29 | <5 |
| 12 | — | 6.5 | — | 3.4 | 4.54 | 11.0 | 113 | 52.5 | 0.35 | <5 |
| 13 | 5.3 | — | — | — | 4.54 | 11.0 | 118 | 76.5 | defects | ~10 |

TABLE 2-continued

| | Blowing Agent Loading | | | | Polystyrene Resin | | | Foam Properties | | |
|---|---|---|---|---|---|---|---|---|---|---|
| Example | 134a (wt %) | TFP (wt %) | 1234yf (wt %) | 1233zd (wt %) | Feed (kg/hr) | MFI (g/10 min) | $T_{melt}$ (°C.) | Density (kg/m$^3$) | Cell Size (mm) | OCC (%) |
| 14 | 5.0 | — | — | 5.0 | 4.54 | 11.0 | 116 | 49.9 | 0.05, 0.20 | ~10 |
| 15 | 4.4 | — | — | 4.3 | 4.54 | 11.0 | 116 | 48.0 | 0.08, 0.25 | ~10 |
| 16 | 4.4 | — | — | 5.0 | 4.54 | 11.0 | 116 | 45.6 | 0.09, 0.16 | ~10 |
| 17 | — | — | 4.4 | — | 4.54 | 11.0 | 117 | 90.9 | 0.15 | 5 |
| 18 | — | — | 5.7 | — | 4.54 | 11.0 | 115 | 71.6 | 0.06 | 31.4 |
| 19 | — | — | 4.2 | 4.3 | 4.54 | 11.0 | 114 | 55.2 | 0.12 | <5 |
| 20 | — | — | 4.8 | 5.0 | 4.54 | 11.0 | 113 | 53.5 | 0.08 | <5 |

Examples 21-50

Extruded polystyrene foam was produced using a counter-rotating twin screw extruder with internal barrel diameters or 27 mm and a barrel length of 40 diameters. The screw design was suitable for foaming applications. The pressure in the extruder barrel was controlled with a gear pump and was set high enough such that the blowing agent dissolved in the extruder. The extruder die was an adjustable-lip slot die with a gap width of 6.35 mm. Two grades of general purpose polystyrene was used for the extrusion experiments and fed to the extruder at an overall rate of 4.54 kg/hr (10 lb/hr). Blowing agents were pumped into the polystyrene resin melt at a controlled rate using high pressure delivery pumps. In the extruder, the blowing agent mixed with and dissolved in the resin melt to produce an expandable resin composition. The expandable resin composition was cooled to an appropriate foaming temperature and then extruded from the die where the drop in pressure initiates foaming. Talc was used as a nucleating agent at 0.5 wt % talc in polystyrene.

The density, open cell content, and cell size was measured for foam samples collected during each run. Open cell content was measured using gas pychnometry according to ASTM D285-C, and cell size was measured by averaging the cell diameters from scanning electron microscope (SEM) micrographs of foam sample fracture surfaces. SEM images are also used to observe the cell structure and qualitatively check for open cell content.

Examples 21 to 27 were produced using HFO-1243zf as the only blowing agent at loadings ranging from 4.1 to 8.5 wt %. Examples 24 and 25 duplicate examples 9 and 10 above. The results are summarized in Table 3 and plotted in FIG. 1.

Examples 28 to 30 were produced using trans-HCFO-123zd as the only blowing agent at loadings ranging from 8.6 to 11.7 wt %. The results are summarized in Table 3 and plotted in FIG. 1.

Examples 31 to 39 were produced using blowing agent combinations of from 38 wt % to 66 wt % HFO-1243zf and from 62 wt % to 34 wt % trans-HCFO-123zd as the blowing agents. The total loading of blowing agent ranged from 8.2 to 12.5 wt %. Examples 36 and 37 duplicate examples 12 and 11 above. The results are summarized in Table 3 and plotted in FIG. 1.

Examples 40 to 50 were produced using blowing agent combinations of from 33 wt % to 53 wt % HFO-1243zf, 28 wt % to 52 wt % trans-HCFO-123zd, and from 13 wt % to 20 wt % carbon dioxide (CO2). The total blowing agent loading ranged from 7.6 to 11.3 wt %. The results are summarized in Table 3 and plotted in FIG. 1.

The blowing agent formulations for examples 21 to 50 are shown in Table 3 along with the foam density and the extrusion melt temperature (Tmelt). With the exception of Examples 30 and 38, all foams shown in Table 3 had an open cell content <10%. Examples 30 and 38 had an open cell content 14 to 15%. All foams were generally of good quality with few, if any, defects.

FIG. 1 shows a plot of total blowing agent content versus foam density for examples 21 to 50. As mentioned above, the data are divided into four series: 1) Examples 21 to 27 for HFO-1243zf; 2) Examples 28 to 30 for trans-HCFO-123zd; 3) Examples 31 to 39 for combinations of HFO-1243zf and trans-HCFO-123zd (1243zf/123zd); 4) Examples 40 to 50 for combinations of HFO-1243zf, trans-HCFO-123zd, and carbon dioxide (1243zf/123zd/CO2). The data shows that using the blowing agent combinations of 1243zf/123zd or 1243zf/123zd/CO2 surprisingly permits the production of low density foam over a wider range of blowing agent loadings than either 1243zf or 123zd alone. For example, consider examples 27 and 28, blown with approximately 8.5 wt % 1243zf and 123zd respectively. Examples 31-32 and 40-44, blown with 1243zf/123zd and 1243zf/123zd/CO2 respectively, are of significantly lower density but blown using about the same amount of blowing agent or less. Also, the foam of example 27 had a cell size <0.1 mm whereas all foams of Examples 31-32 and 40-44 had cell sizes of from 0.1-0.3 mm.

TABLE 3

Foams blown with 1243zf, 1233zd, CO2

| | Blowing Agent Composition | | | Blowing Agent Loading | | | | | |
|---|---|---|---|---|---|---|---|---|---|
| Example | 1243zf (wt %) | 12333zd (wt %) | CO2 (wt %) | 1243zf (wt %) | 12333zd (wt %) | CO2 (wt %) | Total (wt %) | Tmelt (°C.) | Density (kg/m$^3$) |
| 21 | 100% | — | — | 4.1 | — | — | 4.1 | 127 | 84.1 |
| 22 | 100% | — | — | 4.9 | — | — | 4.9 | 119 | 70.2 |
| 23 | 100% | — | — | 5.8 | — | — | 5.8 | 123 | 60.7 |
| 24 | 100% | — | — | 6.6 | — | — | 6.6 | 114 | 57.6 |
| 25 | 100% | — | — | 7.2 | — | — | 7.2 | 115 | 56.5 |

TABLE 3-continued

Foams blown with 1243zf, 1233zd, CO2

| | Blowing Agent Composition | | | Blowing Agent Loading | | | | | |
|---|---|---|---|---|---|---|---|---|---|
| Example | 1243zf (wt %) | 12333zd (wt %) | CO2 (wt %) | 1243zf (wt %) | 12333zd (wt %) | CO2 (wt %) | Total (wt %) | Tmelt (°C.) | Density (kg/m³) |
| 26 | 100% | — | — | 7.2 | — | — | 7.2 | 122 | 51.9 |
| 27 | 100% | — | — | 8.5 | — | — | 8.5 | 125 | 53.3 |
| 28 | — | 100% | — | — | 8.6 | — | 8.6 | 113 | 72.2 |
| 29 | — | 100% | — | — | 10.2 | — | 10.2 | 113 | 42.4 |
| 30 | — | 100% | — | — | 11.7 | — | 11.7 | 113 | 55.5 |
| 31 | 65% | 35% | — | 5.3 | 2.9 | — | 8.2 | 117 | 46.8 |
| 32 | 65% | 35% | — | 5.3 | 2.9 | — | 8.2 | 114 | 50.6 |
| 33 | 49% | 51% | — | 4.6 | 4.9 | — | 9.5 | 122 | 45.2 |
| 34 | 49% | 51% | — | 4.6 | 4.9 | — | 9.5 | 118 | 43.2 |
| 35 | 49% | 51% | — | 4.6 | 4.9 | — | 9.5 | 114 | 44.7 |
| 36 | 66% | 34% | — | 6.5 | 3.4 | — | 9.9 | 113 | 52.5 |
| 37 | 38% | 62% | — | 4.1 | 6.6 | — | 10.8 | 113 | 44.3 |
| 38 | 45% | 55% | — | 5.5 | 6.2 | — | 12.1 | 116 | 38.3 |
| 39 | 38% | 62% | — | 4.8 | 7.7 | — | 12.5 | 112 | 41.8 |
| 40 | 52% | 28% | 20% | 4.0 | 2.1 | 1.5 | 7.6 | 114 | 46.9 |
| 41 | 53% | 29% | 19% | 4.2 | 2.3 | 1.5 | 8.0 | 115 | 48.1 |
| 42 | 53% | 29% | 18% | 4.5 | 2.4 | 1.5 | 8.4 | 116 | 47.6 |
| 43 | 53% | 29% | 18% | 4.5 | 2.4 | 1.5 | 8.4 | 120 | 42.9 |
| 44 | 33% | 49% | 17% | 2.9 | 4.2 | 1.5 | 8.6 | 123 | 42.1 |
| 45 | 34% | 50% | 16% | 3.0 | 4.5 | 1.5 | 9.1 | 115 | 43.2 |
| 46 | 43% | 41% | 16% | 3.9 | 3.8 | 1.5 | 9.2 | 115 | 45.8 |
| 47 | 43% | 41% | 17% | 3.9 | 3.8 | 1.5 | 9.2 | 119 | 41.9 |
| 48 | 34% | 50% | 16% | 3.2 | 4.8 | 1.5 | 9.5 | 118 | 41.0 |
| 49 | 34% | 51% | 15% | 3.6 | 5.3 | 1.5 | 10.4 | 117 | 39.8 |
| 50 | 35% | 52% | 13% | 3.9 | 5.9 | 1.5 | 11.3 | 121 | 40.1 |

Examples 51-62

Examples 51 to 53 were produced using HFO-1234yf (2,3,3,3-tetrafluoropropene) as the only blowing agent at loadings ranging from 4.4 to 6.6 wt %. Examples 51 and 52 duplicate examples 17 and 18 above. The results are summarized Table 4 and plotted in FIG. 2.

Examples 54 to 56 were produced using HFC-134a (1,1,1,2-tetrafluoroethane) as the only blowing agent at loadings ranging from 5.0 to 5.8 wt % and are typical of foams produced using HFC-134a with this extrusion system. The results are summarized in Table 4 and plotted in FIG. 2.

Examples 57 and 58 were produced using a combination of 49 wt % HFO-1234yf (2,3,3,3-tetrafluoropropene) and 51 wt % trans-HCFO-123zd (E-1-chloro-3,3,3-trifluoropropene) as the blowing agents at total loadings of 8.5 wt % and 9.5 wt % respectively. Examples 57 and 58 duplicate examples 19 and 20 above. The results are summarized in Table 4 and plotted in FIG. 2.

Examples 59 to 62 were produced using combinations of from 47 wt % to 51 wt % HFC-134a and from 53 wt % to 49 wt % trans-HCFO-123zd as the blowing agents at total loadings of 8.6 wt % and 10.0 wt %. Examples 60 to 62 duplicate examples 14 to 16 above. The foams were all of good quality with few defects. The results are shown in Table 4 and plotted in FIG. 2.

Figure 2:
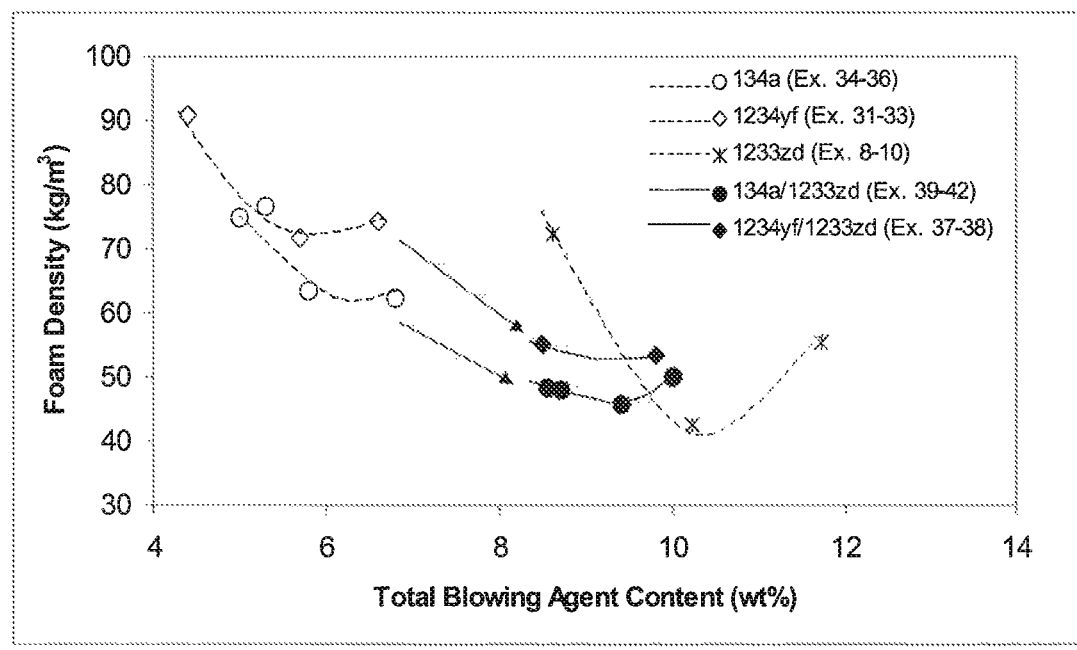
FIG. 2 is a plot of total blowing agent content versus foam density for examples 51 through 62.

The results shown in Table 4 and FIG. 2 show the surprising and unexpected benefits of using HCFO-123zd as a coblowing agent in combination with other blowing agents, particularly those with lower solubility in the resin such as HFO-1234yf and HFC-134a.

TABLE 4

Foams blown with 1234yf, 134a, 1233zd

| | Blowing Agent Composition | | | Blowing Agent Loading | | | | | | |
|---|---|---|---|---|---|---|---|---|---|---|
| Example | 1234yf (wt %) | 134a (wt %) | 1233zd (wt %) | 1234yf (wt %) | 134a (wt %) | 1233zd (wt %) | Total (wt %) | Tmelt (°C.) | Density (kg/m³) | OCC (%) |
| 51 | 100% | — | — | 4.4 | — | — | 4.4 | 117 | 90.9 | <10 |
| 52 | 100% | — | — | 5.7 | — | — | 5.7 | 115 | 71.6 | 31 |
| 5 | 100% | — | — | 6.6 | — | — | 6.6 | 115 | 74.3 | 15 |
| 54 | — | 100% | — | — | 5.3 | — | 5.3 | 115 | 76.5 | <5 |
| 55 | — | 100% | — | — | 5.0 | — | 5.0 | 127 | 74.9 | <5 |
| 56 | — | 100% | — | — | 5.8 | — | 5.8 | 112 | 63.4 | 14 |
| 57 | 49% | — | 51% | 4.2 | — | 4.3 | 8.5 | 114 | 55.2 | <5 |
| 58 | 49% | — | 51% | 4.8 | — | 5.0 | 9.8 | 113 | 53.5 | <1 |
| 59 | — | 50% | 50% | — | 4.2 | 4.3 | 8.6 | 114 | 48.35 | <10 |
| 60 | — | 51% | 49% | — | 4.4 | 4.3 | 8.7 | 116 | 48.0 | <10 |
| 61 | — | 47% | 53% | — | 4.4 | 5.0 | 9.4 | 116 | 45.6 | <10 |
| 62 | — | 50% | 50% | — | 5.0 | 5.0 | 10.0 | 116 | 49.9 | <10 |

Comparative Examples 63-65

Figure 3:
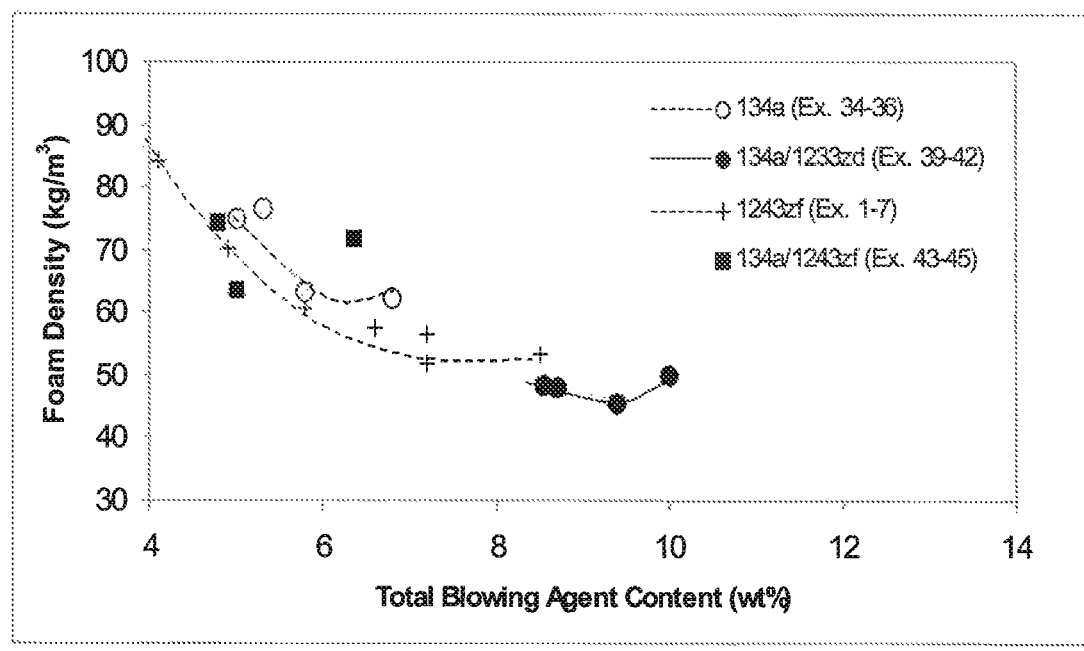
FIG. 3 is a plot of total blowing agent content versus foam density for comparative examples 63 through 65.

Comparative examples 63 to 65 were produced using combinations of HFC-134a and HFO-1243zf (3,3,3-trifluoropropene) as the blowing agents. Examples 63 and 64 were produced using a blowing agent combination with 36 wt % HFO-1243zf and 64 wt % HFC-134a and total blowing agent loadings of 6.4 wt % and 4.8 wt % respectively. Example 65 was produced using equal parts by weight of HFO-1243zf and HFC-134a at a total blowing agent loading of 5.0 wt %. The foam of example 63, produced using the highest blowing agent loading of this series of samples, had a very small foam cell size and noticeable defects. Surprisingly this is in contrast to examples 59 to 62 produced using combinations of HFC-134a with trans-HCFO-123zd, which were relatively defect free and of good quality, lower density, and lower open cell content. These examples show the benefit of using the HCFOs of the present invention as coblowing agents over HFOs as coblowing agents. The results are shown in Table 5 and plotted in FIG. 3.

TABLE 5

Foams blown with 1243zf, 134a

| | Blowing Agent Composition | | Blowing Agent Loading | | | | | |
|---|---|---|---|---|---|---|---|---|
| Example | 1243zf (wt %) | 134a (wt %) | 1243zf (wt %) | 134a (wt %) | Total (wt %) | Tmelt (° C.) | Density (kg/m³) | OCC (%) |
| 63 | 36% | 64% | 2.3 | 4.0 | 6.4 | 110 | 71.9 | 14 |
| 64 | 36% | 64% | 1.7 | 3.0 | 4.8 | 116 | 74.2 | <10 |
| 65 | 50% | 50% | 2.5 | 2.5 | 5.0 | 118 | 63.5 | <10 |

Comparative Examples 66-69 and Examples 70-71

Batch Foaming

Batch-wise foaming experiments were conducted in 300 mL stainless steel autoclaves. For each example, approximately 6 or 8 gm of polystyrene powder was loaded into the autoclave. The autoclave was sealed and then evacuated to vacuum. Approximately 30-50 gm of total blowing agent was then charged to the autoclave; if multiple blowing agents were used, each was charged separately. The autoclave was then heated to achieve to the desired temperature and elevated pressure and then maintained at that temperature for about 24 hours. To initiate foaming after the 24 hour wait period, the autoclave was rapidly degassed by opening a vent port. The autoclave was then opened and the foam sample removed and analyzed.

Comparative Example 66: the blowing agent was 2,3,3,3-tetrafluoropropene (1234yf).
Comparative Example 67: the blowing agent was trans-1,3,3,3-tetrafluoropropene (1234ze(E)).
Comparative Example 68: the blowing agent was a combination of 50 wt % 1234ze(E) and 50 wt % 1234yf.
Comparative Example 69: the blowing agent was a combination of 50 wt % 1234ze(E) and 50 wt % 1,1,1,3,3-pentafluoropropene (245 fa).
Example 70: the blowing agent was a combination of 50 wt % 1234ze(E) and 50 wt % trans-1-chloro-3,3,3-trifluoropropene (123zd(E)).
Example 71: the blowing agent was a combination of 74 wt % 1234ze(E) and 26 wt % trans-1-chloro-3,3,3-trifluoropropene (123zd(E)).

The resulting foam densities are summarized in Table 1.

TABLE 1

Batch Foaming of Polystyrene

| Example | Blowing Agent 1 (gm) | Blowing Agent 2 (gm) | Foam Density (kg/m³) |
|---|---|---|---|
| Comp. 66 | 1234yf (100 wt %) | — | 228 |
| Comp. 67 | 1234ze(E) (100 wt %) | — | 75.0 |
| Comp. 68 | 1234ze(E) (50 wt %) | 1234yf (50 wt %) | 115 |
| Comp. 69 | 1234ze(E) (50 wt %) | 245fa (50 wt %) | 86.7 |
| 70 | 1234ze(E) (50 wt %) | 1233zd(E) (50 wt %) | 38.6 |
| 71 | 1234ze(E) (74 wt %) | 1233zd(E) (26 wt %) | 62.5 |

The results show that the blowing agent combinations of 1234ze(E) with 1234yf or 245fa produced foam with higher foam density than when using 1234ze(E) alone, whereas the combination of 1234ze(E) with 123zd(E) showed a beneficial reduction in foam density.

The examples shows that the combination of the present invention provides foam forming mix that processes acceptably and which produces foam of commercially acceptable cell size and density while the components individually do not produce commercially acceptable foam and/or have processability problems. It was surprising and unexpected that the combination of blowing agents that did not produce a commercially acceptable foam were able to produce a commercially acceptable foam when used in combination.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A foam product comprising;
   a thermoplastic foam material selected from the group consisting of polystyrene, polyethylene, polypropylene, or mixtures thereof; and
   a blowing agent comprising the hydrochlorofluoroolefin 1-chloro-3,3,3-trifluoropropene, and the hydrofluorocarbon coblowing agent 1,3,3,3-tetrafluoropropene; wherein said foam product exhibits a density below about 75 kg/m³.

2. The foam product of claim 1 further comprising a second coblowing agent selected from non-hydrochlorofluoroolefin hydrofluoroolefin, an alkane, carbon dioxide, an atmospheric gas, an inert gas, and mixtures thereof.

3. The foam product of claim 1 wherein said 1-chloro-3,3,3-trifluoropropene contains greater than about 75 wt % of the trans-isomer.

4. The foam product of claim 2 wherein said non-hydrochlorofluoroolefin hydrofluoroolefin is selected from C3 through C5 fluorinated alkene or mixtures thereof.

5. The foam product of claim 4 wherein said fluorinated alkene is a pentafluoropropene.

6. The foam product of claim 1 wherein said 1,3,3,3-tetrafluoropropene is selected from cis-1,3,3,3-tetrafluoropropene; trans-1,3,3,3-tetrafluoropropene; or mixtures thereof.

7. The foam product of claim 5 wherein said pentafluoropropene is selected from cis-1,2,3,3,3-pentafluoropropene; trans-1,2,3,3,3-pentafluoropropene, or mixtures thereof.

8. The blowing agent composition of claim 2 wherein said alkane is selected from propane, butane, pentane, hexane, or mixtures thereof.

9. The foam product of claim 8 wherein said pentane is selected from n-pentane, cyclopentane, iso-pentane or mixtures thereof.

10. The foam product of claim 1 further comprising an alcohol.

11. The foam product of claim 10 wherein said alcohol is selected from ethanol, iso-propanol, propanol, butanol, ethyl hexanol, methanol, or mixtures thereof.

12. The foam product of claim 1 further comprising an ether.

13. The foam product of claim 12 wherein said ether is selected from dimethyl ether, diethyl ether, methylethyl ether, or mixtures thereof.

14. The foam product of claim 1 further comprising a ketone.

15. The foam product of claim 14 wherein said ketone is selected from acetone, methyl ethyl ketone, and mixtures thereof.

16. The foam product of claim 1 further comprising dyes, pigments, cell-controlling agents, fillers, antioxidants, extrusion aids, stabilizing agents, antistatic agents, fire retardants, IR attenuating agents, thermally insulating additives, plasticizers, viscosity modifiers, impact modifiers, gas barrier resins, carbon black, surfactants, and mixtures thereof.

17. A foam product comprising:
a thermoplastic foam material selected from the group consisting of polystyrene, polyethylene, polypropylene, or mixtures thereof; and
a blowing agent comprising from about 25 wt % to about 50 wt % of the hydrochlorofluoroolefin 1-chloro-3,3,3-trifluoropropene and from about 50 wt % to about 75 wt % of 1,3,3,3-tetrafluoropropene; wherein said foam product exhibits a density below about 75 kg/m$^3$.

18. The foam product of claim 17 further comprising a second coblowing agent selected from non-hydrochlorofluoroolefin hydrofluoroolefin, an alkane, carbon dioxide, an atmospheric gas, an inert gas, and mixtures thereof.

19. The foam product of claim 18 wherein said 1-chloro-3,3,3-trifluoropropene contains greater than about 75 wt % of the trans-isomer.

20. The foam product of claim 18 wherein said non-hydrochlorofluoroolefin hydrofluoroolefin is selected from C3 through C5 fluorinated alkene or mixtures thereof.

21. The foam product of claim 20 wherein said fluorinated alkene is a pentafluoropropene.

22. The foam product of claim 17 wherein said 1,3,3,3-tetrafluoropropene is selected from cis-1,3,3,3-tetrafluoropropene, tetrafluoropropene, or mixtures thereof.

23. The foam product of claim 21 wherein said pentafluoropropene is selected from cis-1,2,3,3,3-pentafluoropropene; trans-1,2,3,3,3-pentafluoropropene, or mixtures thereof.

24. The blowing agent composition of claim 17 wherein said alkane is selected from propane, butane, pentane, hexane, or mixtures thereof.

25. The foam product of claim 24 wherein said pentane is selected from n-pentane, cyclopentane, iso-pentane or mixtures thereof.

26. The foam product of claim 17 further comprising an alcohol.

27. The foam product of claim 26 wherein said alcohol is selected from ethanol, iso-propanol, propanol, butanol, ethyl hexanol, methanol, or mixtures thereof.

28. The foam product of claim 17 further comprising an ether.

29. The foam product of claim 28 wherein said ether is selected from dimethyl ether, diethyl ether, methylethyl ether, or mixtures thereof.

30. The foam product of claim 17 further comprising a ketone.

31. The foam product of claim 30 wherein said ketone is selected from acetone, methyl ethyl ketone, and mixtures thereof.

32. The foam product of claim 17 further comprising dyes, pigments, cell-controlling agents, fillers, antioxidants, extrusion aids, stabilizing agents, antistatic agents, fire retardants, IR attenuating agents, thermally insulating additives, plasticizers, viscosity modifiers, impact modifiers, gas barrier resins, carbon black, surfactants, and mixtures thereof.

* * * * *